(No Model.)
J. T. GUTHRIE.
WIRE AND PICKET FENCE MACHINE.
No. 595,623. Patented Dec. 14, 1897.
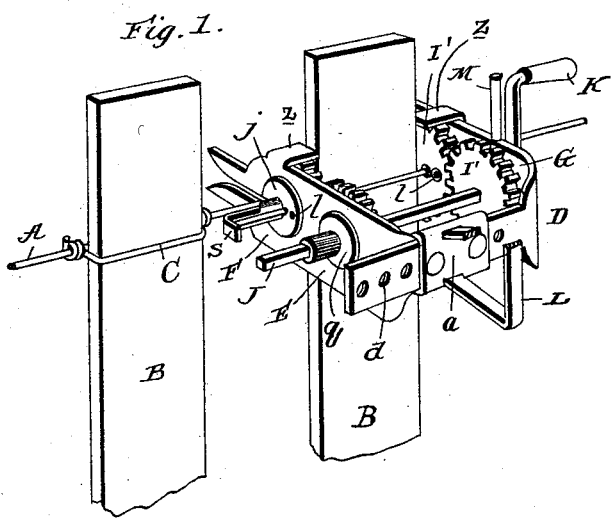
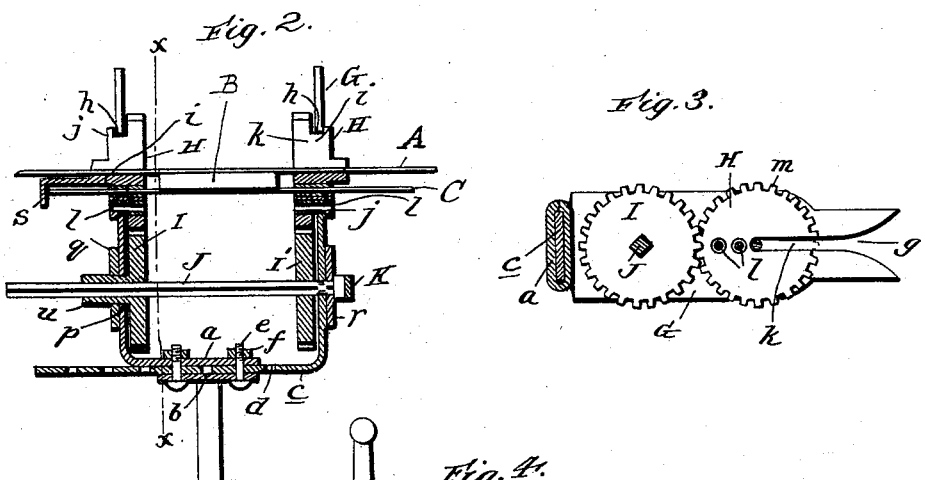
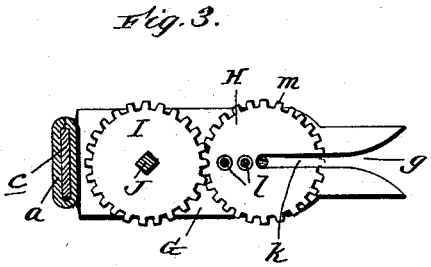
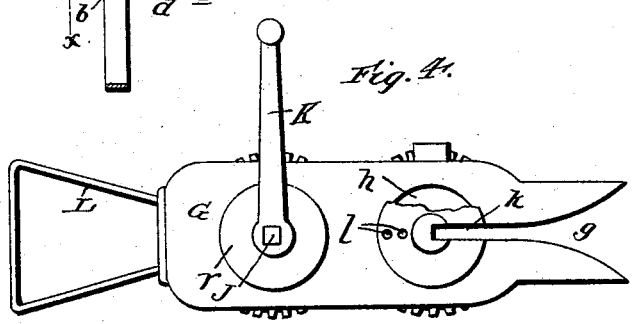
Witnesses:
Inventor
J. T. Guthrie
By James J. Sheehy
Attorney

United States Patent Office.

JAMES T. GUTHRIE, OF LEESBURG, OHIO.

WIRE-AND-PICKET-FENCE MACHINE.

SPECIFICATION forming part of Letters Patent No. 595,623, dated December 14, 1897.

Application filed August 24, 1897. Serial No. 649,303. (No model.)

*To all whom it may concern:*

Be it known that I, JAMES T. GUTHRIE, a citizen of the United States, residing at Leesburg, in the county of Highland and State of Ohio, have invented certain new and useful Improvements in Fence-Machines; and I do declare the following to be a full, clear, and exact description of the invention, such as will enable others skilled in the art to which it appertains to make and use the same.

My invention relates to wire-and-picket-fence machines, and it will be fully understood from the following description and claims when taken in conjunction with the annexed drawings, in which—

Figure 1 is a perspective view of my improved machine as it appears when in operation. Fig. 2 is a horizontal section of the same. Fig. 3 is a vertical section taken in the plane indicated by the line $x\,x$ of Fig. 2, and Fig. 4 is an enlarged side elevation of the machine with one of the twisting-wheels partly broken away.

In the said drawings similar letters designate corresponding parts in all of the several views, referring to which—

A indicates the runner of a wire fence. B indicates pickets which are secured to said runner by the wires C, and D indicates my improved machine for applying the tie-wires and thereby securing the pickets to the runners. The main frame E of this machine D may be of any construction suitable to the purpose, but I prefer to have it comprise two members adjustably connected together, so as to permit of their being fixed at various distances apart to adapt the machine for connecting pickets of various widths to runner-wires. In the preferred embodiment of this part of my invention the frame E comprises the member F, provided at its rear end with an angularly-disposed arm $a$, carrying a loop $b$, and the member G, arranged parallel to the member F and provided at its rear end with an angularly-disposed arm $c$, which extends through the loop $b$ and has apertures $d$, and bolts $e$ extending through apertures in the opposite walls of the loop $b$ and the arm $c$ and removably secured in position by nuts $f$. In virtue of this construction it will be appreciated that the members F G may be fixed at various distances apart, so as to enable them to receive pickets of various widths between them and adapt the machine to connect such pickets to a runner-wire. The said frame members F G are provided in their outer ends with notches $g$, which preferably have flaring mouths, as shown, and said members are also provided adjacent to the inner end of the notches $g$ with journal-bearings $h$ to receive the journals $i$ of twisting-wheels H. These twisting-wheels H rest at the inner sides of the frame members F G and are preferably secured in position by enlargements $j$, fixed on the journals $i$ at the outer sides of the frame members, as better shown in Fig. 2. Said wheels H are provided with the notches $k$, designed to register with the notches $g$ of the frame members, and they are also provided with one or more (preferably two) transverse wire-receiving apertures $l$, arranged at different distances from the center of the wheels and adapted to enable the machine to properly fasten pickets of different thicknesses.

The twisting-wheels may be operated through the medium of any suitable mechanism, but I prefer to provide them with a corresponding number of peripheral gear-teeth $m$ and operate them through the medium of correspondingly-toothed gear-wheels I I'. (Better shown in Fig. 2.) The gear-wheel I has a journal $u$ arranged in a bearing $p$ in the frame member F, and also has an enlargement $q$ on said journal at the outer side of the frame member F, whereby it will be seen that it is secured to said frame member, but is free to turn. Said wheel I is also provided with an angular central aperture, which receives a crank-shaft J, of angular form in cross-section, whereby it will be seen that while the wheel will turn with the shaft it is free to move laterally thereon when the frame members F G are moved toward or from each other to diminish or increase the width of the machine. The wheel I' may be fixed to the shaft J in any suitable manner, as may also the enlargement $r$ at the outer side of the frame member G.

K indicates a crank for turning the shaft J, which crank may be applied to either end of the said shaft. L indicates a handle which is preferably connected to the loop $b$, as shown, and M indicates what I will for convenience of description term a "gage-pin," it being so arranged that when the crank L is brought into alinement with it the notches $k$ of the twister-wheels will register with the notches $g$ of the frame members. This pin is shown as fixedly connected to the frame-bar G, but it is obvious that it may be adapted to screw into sockets in the frame members and may be changed from one member to the other when the crank is removed from one end of the shaft J and placed on the other end thereof. It is also obvious that the pin may be screwed into a socket in the lower edge of the frame-bar G, and the machine may then be converted into a left-hand machine by turning it upside down.

In using my improved machine the notches $k$ in the twister-wheels are made to register with the notches $g$ in the frame members F G, as shown in Fig. 1, and the machine is then placed in engagement with the runner-wire A, as shown. The tie-wire C is then passed through the desired apertures $l$ of the twister-wheels until one of its ends abuts against a stop $s$, after which the picket B is placed between the tie and runner wires, as best shown in Fig. 2, and also between the inwardly-extending lugs $z$ of the frame-bars F G, which serve to prevent the picket from moving laterally when the tie-wire is being placed in position and the machine is being operated. The twister-wheels are now turned through the medium of the crank and gearing described, when the ends of the tie-wire will be tightly twisted about the runner-wire in the manner shown at the left of Fig. 1. The machine is then removed from the runner-wire and the operation described is repeated until the desired number of pickets are secured to the runner wire or wires.

Having thus described my invention, what I claim is—

1. In a fence-machine, the combination of a frame comprising two members having notches in their ends; said members being adjustably connected together whereby they may be fixed at various distances apart, twister-wheels, with peripheral gear-teeth, journaled in said members and having notches extending from their centers to their peripheries and also having transverse apertures arranged off their centers, a crank-shaft of angular form in cross-section journaled in the frame, and gear-wheels meshing with the gear twister-wheels and mounted on the crank-shaft so as to turn therewith, substantially as specified.

2. In a fence-machine, the combination of a frame comprising two members having notches in their ends; said members being adjustably connected together whereby they may be fixed at various distances apart, twister-wheels, with peripheral gear-teeth, journaled in said members and having notches extending from their centers to their peripheries and also having transverse apertures arranged off their centers, a gear-wheel I journaled in one frame member and meshing with one gear twister-wheel and having a central angular aperture, a crank-shaft of angular form in cross-section journaled in one frame member and extending loosely through the central aperture of the gear-wheel, and a gear-wheel I' fixed on said shaft and meshing with the contiguous gear twister-wheel, substantially as specified.

3. In a fence-machine, the combination of the frame comprising a member F having a notch in one end and an angularly-disposed arm at its opposite end carrying a loop, a member G having a notch in one end and an angularly-disposed arm at its other end extending through the loop and provided with transverse apertures at intervals in its length, and removable bolts extending through registered apertures of the loop and the apertured arm, gear twister-wheels journaled in the members of the frame and having notches extending from their centers to their peripheries and also having transverse apertures arranged off their centers, a gear-wheel journaled in one frame member and meshing with one gear twister-wheel and having a central angular aperture, a crank-shaft of angular form in cross-section journaled in one frame member and extending loosely through the central aperture of the gear-wheel, and another gear-wheel fixed on said shaft and meshing with the contiguous gear twister-wheel, substantially as specified.

4. In a fence-machine, the combination of a frame having arms provided with notches in their ends to receive a runner-wire and also provided with the inwardly-directed picket-holding lugs $z$, twister-wheels journaled in said arms and having notches extending from their centers to their peripheries and adapted to register with the notches in the frame-arms and receive the runner-wire, and also having transverse apertures arranged off their centers and adapted to receive a tie-wire, and a suitable means for rotating said twister-wheels in concert, substantially as specified.

In testimony whereof I affix my signature in presence of two witnesses.

JAMES T. GUTHRIE.

Witnesses:
PAULINA HORST,
O. F. HORST.